United States Patent
Fan et al.

(10) Patent No.: US 10,616,845 B2
(45) Date of Patent: Apr. 7, 2020

(54) COORDINATED RESOURCE DISCOVERY

(71) Applicant: QUALCOMM Incorporated, San Diego, CA (US)

(72) Inventors: Michael Mingxi Fan, San Diego, CA (US); Juan Montojo, San Diego, CA (US); Naga Bhushan, San Diego, CA (US); Aleksandar Damnjanovic, Del Mar, CA (US); Ahmed Kamel Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 15/474,546

(22) Filed: Mar. 30, 2017

(65) Prior Publication Data

US 2018/0110022 A1    Apr. 19, 2018

Related U.S. Application Data

(60) Provisional application No. 62/407,923, filed on Oct. 13, 2016.

(51) Int. Cl.
*H04B 7/208* (2006.01)
*H04W 56/00* (2009.01)
(Continued)

(52) U.S. Cl.
CPC ........ *H04W 56/002* (2013.01); *H04W 16/14* (2013.01); *H04W 56/001* (2013.01); *H04W 72/0446* (2013.01); *H04W 72/10* (2013.01)

(58) Field of Classification Search
None
See application file for complete search history.

(56) References Cited

U.S. PATENT DOCUMENTS

2008/0039107 A1*  2/2008  Ma ........................ H04B 7/02
                                                                  455/450
2009/0086672 A1  4/2009  Gholmieh et al.
(Continued)

FOREIGN PATENT DOCUMENTS

WO    WO-2015176771 A1    11/2015

OTHER PUBLICATIONS

International Search Report and Written Opinion—PCT/US2017/055586—ISA/EPO—dated Jan. 9, 2018.
(Continued)

*Primary Examiner* — Sithu Ko
(74) *Attorney, Agent, or Firm* — Holland & Hart LLP

(57) ABSTRACT

Methods, systems, and devices for wireless communication are described that provide for discovery of resources in a wireless communications system. The wireless communications system supports operations for multiple network operating entities that share a radio frequency spectrum. To discover and perform synchronization with the wireless communications system, a common preamble may be transmitted by nodes associated with multiple network operating entities. The common preamble may include information common to each of the multiple network operating entities which may be used by a device to identify neighboring wireless nodes, available network operating entities, or sub-intervals designated for prioritized or opportunistic use by one or more network operating entities.

33 Claims, 13 Drawing Sheets

(51) Int. Cl.
　　　*H04W 16/14*　　(2009.01)
　　　*H04W 72/04*　　(2009.01)
　　　*H04W 72/10*　　(2009.01)

(56) References Cited

U.S. PATENT DOCUMENTS

| | | | | |
|---|---|---|---|---|
| 2010/0061333 | A1* | 3/2010 | Marsh | H04W 72/082 370/330 |
| 2015/0049741 | A1* | 2/2015 | Chen | H04W 48/12 370/336 |
| 2015/0092758 | A1* | 4/2015 | Chen | H04W 16/14 370/336 |
| 2015/0281974 | A1* | 10/2015 | Ghasemzadeh | H04W 16/14 455/454 |
| 2016/0142994 | A1 | 5/2016 | Luo et al. | |

OTHER PUBLICATIONS

Kyocera, "Further Considerations on the Essential Functionalities for LAA," 3GPP Draft; R1-144955, 3rd Generation Partnership Project (3GPP), Mobile Competence Centre; 650, Route Des Lucioles; F-06921 Sophia-Anti Polls Cedex; France, vol. RAN WG1, No. San Francisco, Nov. 17, 2014, XP050895108, Retrieved from the Internet: http://www.3gpp.org/ftp/tsg_ran/WG1_RL1/TSGR1_79/Docs/R1-144955.zip (accessed Oct. 27, 2017), 10 pages.

\* cited by examiner

COORDINATED RESOURCE DISCOVERY

CROSS REFERENCES

The present application for patent claims priority to U.S. Provisional Patent Application No. 62/407,923 by FAN, et al., entitled "Coordinated Resource Discovery," filed Oct. 13, 2016, assigned to the assignee hereof.

BACKGROUND

The following relates generally to wireless communication, and more specifically to coordinated resource discovery.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

A wireless communications system may operate over shared spectrum, meaning that the wireless communications system includes one or more frequency bands that may be shared by multiple network operating entities. In some instances, sharing of the frequency bands may include subdividing the frequency bands into narrower bands dedicated for use by specific network operating entities. In other instances, some portions of band spectrum may be available for use by more than one network operating entity.

Use of the available band spectrum may then be subject to a contention procedure that may involve the use of a medium-sensing procedure. For example, to avoid interference between different devices or between devices operated by different network operating entities, the wireless communications system may employ medium-sensing procedures, such as listen-before-talk (LBT), to ensure a particular channel is clear before transmitting a message. Medium-sensing procedures may utilize substantial signaling overhead and may result in increased latency, thus adversely affecting the use of shared spectrum by multiple network operating entities. Accordingly, procedures for improved allocation and using shared spectrum between network operating entities are desirable.

SUMMARY

The described techniques provide for discovery of resources in a wireless communications system in which multiple operating entities (e.g., network operators) share a radio frequency spectrum. Discovery may involve the transmission of a common preamble including information that is common to each of the multiple network operating entities in a wireless communications system. The preamble may be transmitted by multiple nodes, and nodes associated with the same network operating entity may transmit the same preamble or a preamble that includes at least a portion of the same information. The common preamble may include synchronization information which may be used by one or more devices that receive the common preamble to align with a given interval (e.g., a frame) in time. The common preamble may also include an indication of an acquisition sub-interval of a frame during which each network operating entity is allocated resources for exclusive-use for transmitting or broadcasting signals (e.g., to other devices associated with the network operating entity). Using the common preamble, a device may identify neighboring wireless nodes, available network operating entities, or sub-intervals designated for prioritized or opportunistic use by one or more network operating entities.

A method of wireless communication is described. The method may include receiving, within a frame in a shared radio frequency spectrum band shared by a plurality of network operating entities, a common preamble for synchronizing the plurality of network operating entities with the frame, receiving, during an acquisition sub-interval of the frame and after receipt of the common preamble, one or more network operating entity-specific signals, and identifying, based on the one or more network operating entity-specific signals, neighboring wireless nodes.

An apparatus for wireless communication is described. The apparatus may include means for receiving, within a frame in a shared radio frequency spectrum band shared by a plurality of network operating entities, a common preamble for synchronizing the plurality of network operating entities with the frame, means for receiving, during an acquisition sub-interval of the frame and after receipt of the common preamble, one or more network operating entity-specific signals, and means for identifying, based on the one or more network operating entity-specific signals, neighboring wireless nodes.

Another apparatus for wireless communication is described. The apparatus may include a processor, memory in electronic communication with the processor, and instructions stored in the memory. The instructions may be operable to cause the processor to receive, within a frame in a shared radio frequency spectrum band shared by a plurality of network operating entities, a common preamble for synchronizing the plurality of network operating entities with the frame, receive, during an acquisition sub-interval of the frame and after receipt of the common preamble, one or more network operating entity-specific signals, and identify, based on the one or more network operating entity-specific signals, neighboring wireless nodes.

A non-transitory computer readable medium for wireless communication is described. The non-transitory computer-readable medium may include instructions operable to cause a processor to receive, within a frame in a shared radio frequency spectrum band shared by a plurality of network operating entities, a common preamble for synchronizing the plurality of network operating entities with the frame, receive, during an acquisition sub-interval of the frame and after receipt of the common preamble, one or more network operating entity-specific signals, and identify, based on the one or more network operating entity-specific signals, neighboring wireless nodes.

Some examples of the method, apparatus, and non-transitory computer-readable medium described above may further include processes, features, means, or instructions for receiving the common preamble from multiple wireless nodes, wherein each of the multiple wireless nodes operates according to at least one of the plurality of network operating entities.

In some examples of the method, apparatus, and non-transitory computer-readable medium described above, the common preamble comprises information related to the acquisition sub-interval of the frame, synchronization information for the frame, or combinations thereof.

In some examples of the method, apparatus, and non-transitory computer-readable medium described above, the information related to the acquisition sub-interval of the frame comprises at least one of a beginning of the acquisition sub-interval, an end of the acquisition sub-interval, a duration of the acquisition sub-interval, or combinations thereof.

In some examples of the method, apparatus, and non-transitory computer-readable medium described above, the common preamble comprises a signature common to each of the plurality of network operating entities.

Some examples of the method, apparatus, and non-transitory computer-readable medium described above may further include processes, features, means, or instructions for identifying multiple sub-intervals of the frame, each of the multiple sub-intervals designated for prioritized use by one of the plurality of network operating entities.

In some examples of the method, apparatus, and non-transitory computer-readable medium described above, the multiple sub-intervals may be non-overlapping.

In some examples of the method, apparatus, and non-transitory computer-readable medium described above, the multiple sub-intervals may be disjoint.

Some examples of the method, apparatus, and non-transitory computer-readable medium described above may further include processes, features, means, or instructions for identifying multiple sub-intervals may be based at least in part on the common preamble, the one or more network operating entity-specific signals, or combinations thereof.

In some examples of the method, apparatus, and non-transitory computer-readable medium described above, nodes from the same network operating entity share the same network operating entity-specific signal.

Some examples of the method, apparatus, and non-transitory computer-readable medium described above may further include processes, features, means, or instructions for identifying multiple sub-intervals of the frame, each of the multiple sub-intervals designated for opportunistic use by one of the plurality of network operating entities.

Some examples of the method, apparatus, and non-transitory computer-readable medium described above may further include processes, features, means, or instructions for receiving priority information associated with one or more network operating entities of the plurality of network operating entities.

In some examples of the method, apparatus, and non-transitory computer-readable medium described above, the priority information indicates a priority level for each of the one or more network operating entities for using one or more of the multiple sub-intervals.

A method of wireless communication is described. The method may include receiving, in a shared radio frequency spectrum band shared by a plurality of network operating entities, one or more network operating entity-specific signals, and identifying, based at least in part on the one or more network operating entity-specific signals, neighboring wireless nodes.

An apparatus for wireless communication is described. The apparatus may include means for receiving, in a shared radio frequency spectrum band shared by a plurality of network operating entities, one or more network operating entity-specific signals, and means for identifying, based at least in part on the one or more network operating entity-specific signals, neighboring wireless nodes.

Another apparatus for wireless communication is described. The apparatus may include a processor, memory in electronic communication with the processor, and instructions stored in the memory. The instructions may be operable to cause the processor to receive, in a shared radio frequency spectrum band shared by a plurality of network operating entities, one or more network operating entity-specific signals, and identify, based at least in part on the one or more network operating entity-specific signals, neighboring wireless nodes.

A non-transitory computer readable medium for wireless communication is described. The non-transitory computer-readable medium may include instructions operable to cause a processor to receive, in a shared radio frequency spectrum band shared by a plurality of network operating entities, one or more network operating entity-specific signals, and identify, based at least in part on the one or more network operating entity-specific signals, neighboring wireless nodes.

Some examples of the method, apparatus, and non-transitory computer-readable medium described above may further include processes, features, means, or instructions for receiving, within a frame in a shared radio frequency spectrum band shared by a plurality of network operating entities, a common preamble for synchronizing the plurality of network operating entities with the frame wherein one or more network operating entity-specific signals are received during an acquisition sub-interval of the frame and after receipt of the common preamble.

Some examples of the method, apparatus, and non-transitory computer-readable medium described above may further include processes, features, means, or instructions for receiving the common preamble from multiple wireless nodes, wherein each of the multiple wireless nodes operates according to at least one of the plurality of network operating entities.

In some examples of the method, apparatus, and non-transitory computer-readable medium described above, the common preamble comprises information related to the acquisition sub-interval of the frame, synchronization information for the frame, or combinations thereof.

In some examples of the method, apparatus, and non-transitory computer-readable medium described above, the information related to the acquisition sub-interval of the frame comprises at least one of a beginning of the acquisition sub-interval, an end of the acquisition sub-interval, a duration of the acquisition sub-interval, or combinations thereof.

In some examples of the method, apparatus, and non-transitory computer-readable medium described above, the common preamble comprises a signature common to each of the plurality of network operating entities.

Some examples of the method, apparatus, and non-transitory computer-readable medium described above may further include processes, features, means, or instructions for identifying multiple sub-intervals of the frame, each of the multiple sub-intervals designated for prioritized use by one of the plurality of network operating entities.

In some examples of the method, apparatus, and non-transitory computer-readable medium described above, the multiple sub-intervals may be non-overlapping.

In some examples of the method, apparatus, and non-transitory computer-readable medium described above, the multiple sub-intervals may be disjoint.

Some examples of the method, apparatus, and non-transitory computer-readable medium described above may further include processes, features, means, or instructions for identifying multiple sub-intervals may be based at least in part on the common preamble, the one or more network operating entity-specific signals, or combinations thereof.

In some examples of the method, apparatus, and non-transitory computer-readable medium described above, nodes from the same network operating entity share the same network operating entity-specific signal.

Some examples of the method, apparatus, and non-transitory computer-readable medium described above may further include processes, features, means, or instructions for identifying multiple sub-intervals of the frame, each of the multiple sub-intervals designated for opportunistic use by one of the plurality of network operating entities.

Some examples of the method, apparatus, and non-transitory computer-readable medium described above may further include processes, features, means, or instructions for receiving priority information associated with one or more network operating entities of the plurality of network operating entities.

In some examples of the method, apparatus, and non-transitory computer-readable medium described above, the priority information indicates a priority level for each of the one or more network operating entities for using one or more of the multiple sub-intervals.

DETAILED DESCRIPTION

Wireless communications systems operated by different network operating entities (e.g., network operators) may share spectrum. In some preferred instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum may be gained through discovery or synchronization techniques, as described herein, which may include transmission of a common preamble by one or more nodes associated with various network operating entities (e.g., network operators). The common preamble may include synchronization information common to each of the various network operating entities. A network operating entity may also be referred to as a network operator, network entity, operator, or the like.

Aspects of the disclosure are initially described in the context of wireless communications systems. Aspects of the disclosure are also described in the context of a timing diagram and a process flow diagram. Aspects of the disclosure are further illustrated by and described with reference to apparatus diagrams, system diagrams, and flowcharts that relate to coordinated resource discovery.

Figure 1:
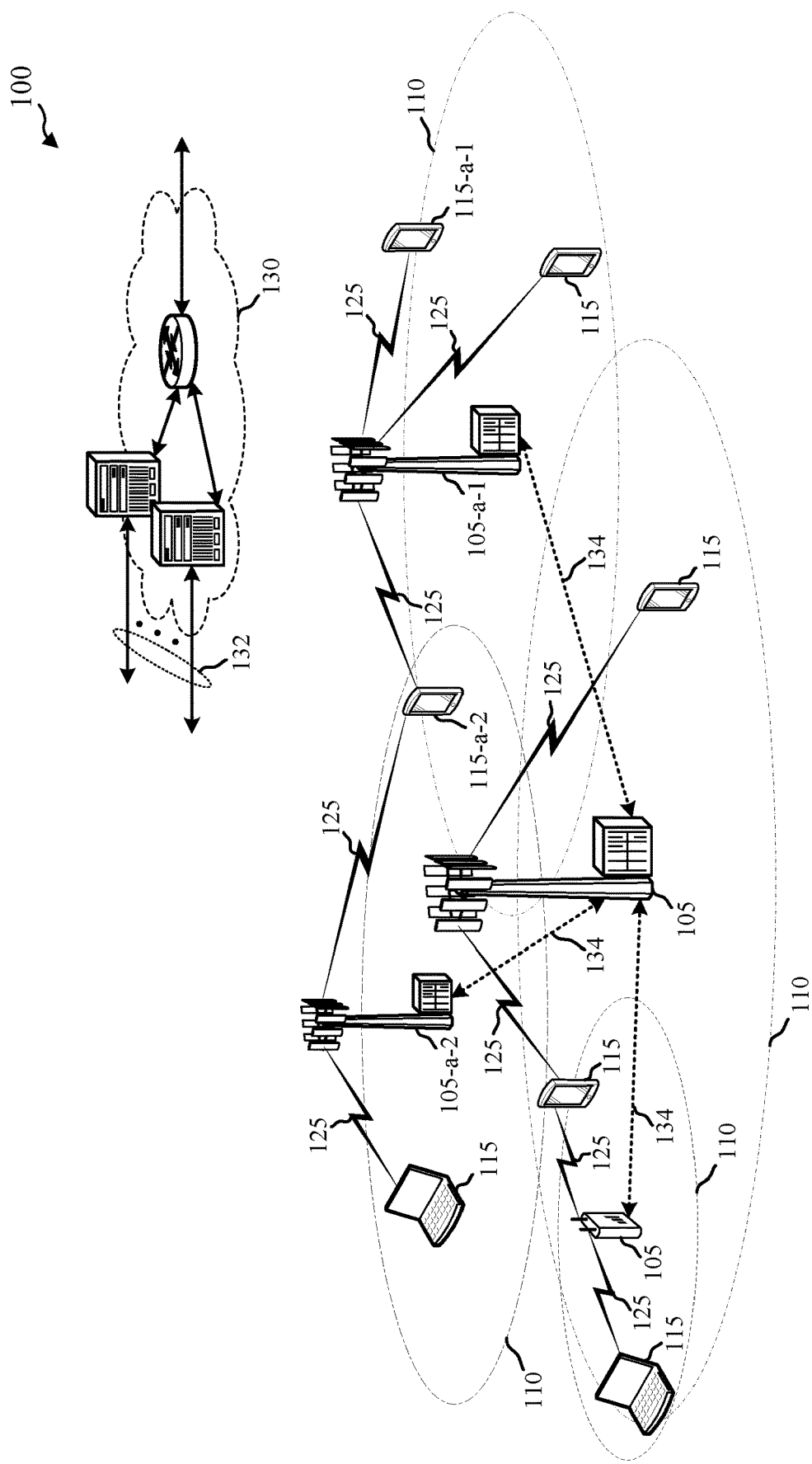
FIG. 1 illustrates an example of a system for wireless communication that supports coordinated resource discovery in accordance with aspects of the present disclosure.

FIG. 1 illustrates an example of a wireless communications system 100 in accordance with various aspects of the present disclosure. The wireless communications system 100 includes base stations 105, user equipment (UEs) 115, and a core network 130. In some examples, the wireless communications system 100 operates over a shared spectrum. The shared spectrum may be unlicensed or partially licensed to one or more network operators. Access to the spectrum may be limited and may be controlled by a separate coordination entity. In some examples, the wireless communications system 100 may be a Long Term Evolution (LTE), or LTE-Advanced (LTE-A) network. In yet other examples, the wireless communications system 100 may be a millimeter wave (mmW) system, a new radio (NR) system, a 5G system, or any other successor system to LTE. The wireless communications system 100 may be operated by more than one network operator. Wireless resources may be partitioned and arbitrated among the different network operators for coordinated communication between the network operators over the wireless communications system 100.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a mobile unit, subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. The core network 130 may provide user authentication, access authorization, tracking, Internet Protocol (IP) connectivity, and other access, routing, or mobility functions. At least some of the base stations 105 (e.g., which may be an example of an evolved NodeB (eNB) or an access node controller (ANC)) may interface with the core network 130 through backhaul links 132 (e.g., S1, S2, etc.) and may perform radio configuration and scheduling for communication with the UEs 115. In various examples, the base stations 105 may communicate, either directly or indirectly (e.g., through core network 130), with each other over backhaul links 134 (e.g., X1, X2, etc.), which may be wired or wireless communication links.

Each base station 105 may also communicate with a number of UEs 115 through a number of other base stations 105, where base station 105 may be an example of a smart radio head. In alternative configurations, various functions of each base station 105 may be distributed across various base stations 105 (e.g., radio heads and access network controllers) or consolidated into a single base station 105.

In some cases, UE 115 and base station 105 may operate in a shared radio frequency spectrum band, which may include licensed or unlicensed frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Accordingly, in some examples, wireless communications system 100 is operated by multiple network operating entities, and the different network operating entities may share wireless spectrum (e.g., unlicensed spectrum). In accordance with aspects of the present disclosure, the resources (e.g., time) shared between the network operating entities may be partitioned and allocated among the network operating entities to facilitate coordinated communications. For example, in wireless communications system 100, base station 105-a-1 may communicate with UE 115-a-1, which may both be associated with a same network operating entity. Base station 105-a-2 may communicate with UE 115-a-2, which may similarly be associated with a different network operating entity. By time-partitioning the shared spectrum according to network operating entities, the communications between base station 105-a-1 and UE 115-a-1 and the communications between base station 105-a-2 and UE 115-a-2 may each occur during respective time intervals and may avail themselves of an entirety of a designated shared spectrum. To do so, and as more fully explained below, certain resources (e.g., time) may be partitioned and allocated to the different network operating entities for certain types of communication.

In some examples, a base station 105 or an entity of the core network 130 may act as a central arbitrator to manage access and coordinate the partitioning of resources among different network operating entities operating within the wireless communications system 100. The central arbitrator may include a spectrum access system (SAS), in some examples.

In some examples, the wireless communications system 100 may be time-synchronized. In this way, different network operating entities may each operate at different time intervals within a frame of time, with each network operating entity being time-synchronized with other network operating entities. Traditionally, a UE 115 attempting to access wireless communications system 100 may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as time division duplexing (TDD) systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain RRC configuration information related to random access channel (RACH) procedures, paging, physical uplink control channel (PUCCH), physical uplink shared channel (PUSCH), power control, sounding reference signal (SRS), and cell barring.

Synchronization with wireless communications system 100 may be performed by one or more wireless nodes (e.g., UEs 115, base station 105, or nodes of the core network 130) using a common preamble. The common preamble may be transmitted by multiple wireless nodes, each of the multiple wireless nodes may be associated with one or more network operating entities. Using the common preamble, a device (e.g., a UE 115) may discover resources (e.g., time) designated for use by one or more network operating entities and may synchronize in time with a frame of a shared radio frequency spectrum.

Figure 2:
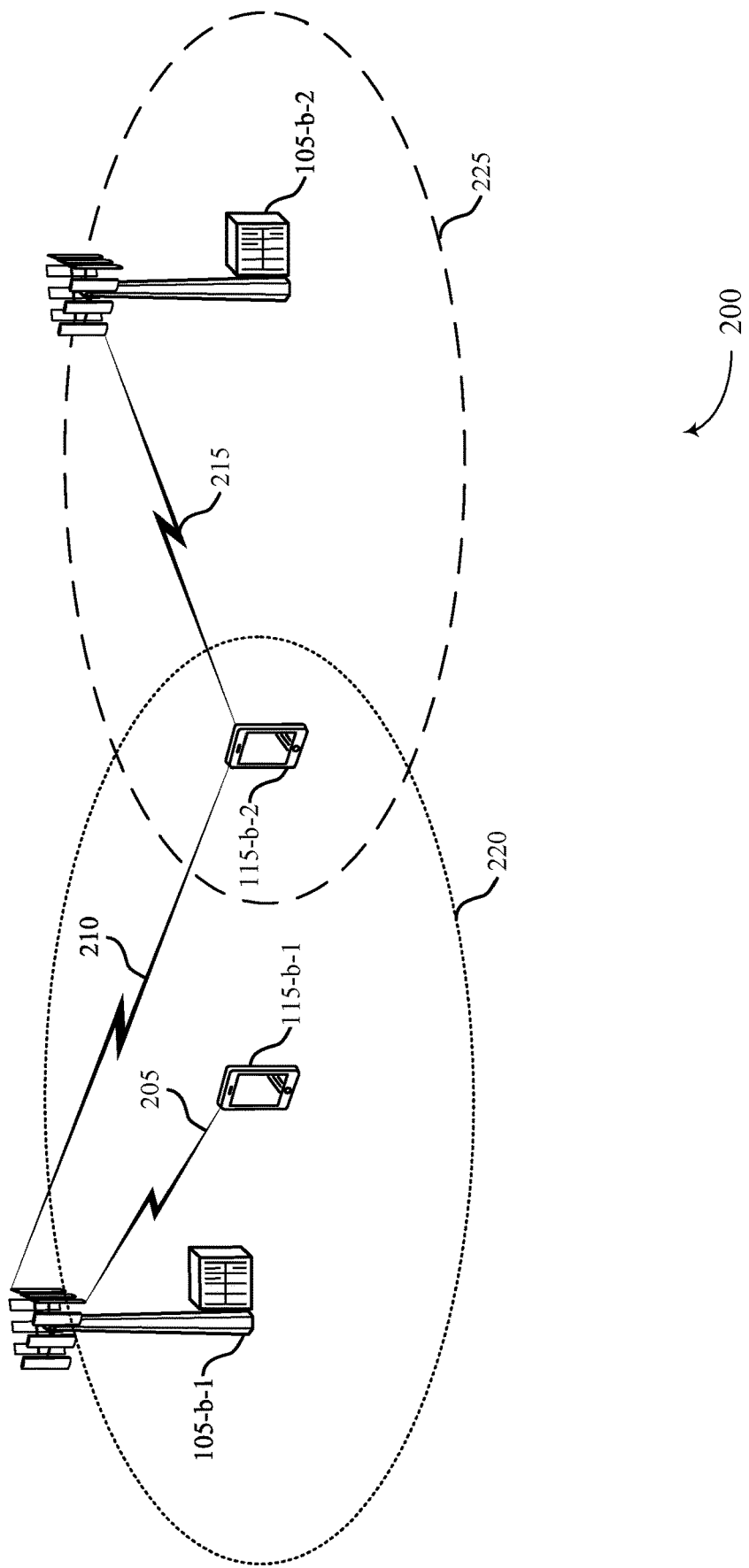
FIG. 2 illustrates an example of a wireless communications systems that supports coordinated resource discovery in accordance with aspects of the present disclosure.

FIG. 2 illustrates an example of a wireless communications system 200 for coordinated resource discovery. Wireless communications system 200 may include a base station 105-*b*-1, a base station 105-*b*-2, a UE 115-*b*-1, and a UE 115-*b*-2, which may be examples of the corresponding devices described with reference to FIG. 1. Base station 105-*b*-1 and base station 105-*b*-2 may communicate with UEs 115 or other wireless devices within their respective coverage areas 220 and 225. In some examples, wireless communications system 200 is operated by multiple network operating entities, also known as network operators, and the different network operating entities may share wireless spectrum (e.g., unlicensed or partially licensed spectrum). In accordance with aspects of the present disclosure, discovery of the resources (e.g., time) shared between the network operating entities may be facilitated through the use of a common preamble.

Base station 105-*b*-1 may be operated by one or more network operating entities. For example, base station 105-*b*-1 may be operated by a first network operating entity to communicate with UE 115-*b*-1 via communication link 205, and base station 105-*b*-1 may be operated by a second network operating entity to communicate with UE 115-*b*-2 via communication link 210. In other examples, base station 105-*b*-1 may be configured to operate according to multiple network operators and may communicate with UE 115-*b*-1 via communication link 205 using multiple operators.

Base station 105-*b*-2 may also be operated by one or more network operating entities. In some examples, base station 105-*b*-2 is operated by a third network operating entity to communicate with UE 115-*b*-2 via communication link 215. In this example, UE 115-*b*-2 may be configured to operate with both the second and third network operating entities. The coordination at UE 115-*b*-2 of communications between base station 105-*b*-1 and base station 105-*b*-2 may be based on a partitioned and allocated time scale between the second and third network operators.

When operated by multiple network operators, as medium-sensing procedures may lead to increased overhead and signals, the multiple network operators may coordinate communications using a shared radio frequency spectrum. The shared spectrum used by wireless communications system 200 may be efficiently used by employing a coordinated resource partitioning scheme between the multiple network operating entities. For example, the shared spectrum may be partitioned by classifying time resources into intervals and assigning the intervals to different network operating entities. In some examples, certain time intervals may be allocated for exclusive use by a particular network operating entity. Other time intervals may be allocated for prioritized use by a particular network operating entity, but may also be for opportunistic use by the other network operating entities. In yet other examples, certain time intervals may be designated for opportunistic use by all network operating entities.

In some cases, a frame of the shared radio frequency spectrum may be divided into multiple sub-intervals in time. One or more sub-intervals may be allocated as an acquisition sub-interval and may be used for acquiring information for multiple network operating entities. Such information may include synchronization information and may be transmitted using a preamble that is common to each of the multiple network operating entities. The common preamble may be transmitted prior to the acquisition sub-interval or may be transmitted within the acquisition sub-interval.

The common preamble may enable a device receiving the common preamble to synchronize with the frame of the shared radio frequency spectrum. In some cases, the common preamble may identify resources (e.g., subframes, symbols, time slots) designated for exclusive use by each of the multiple network operating entities of the wireless communications system 200. Using the exclusive resources, one or more nodes associated with a given network operating entity may transmit operator specific information via a network operating entity-specific preamble.

Figure 3:
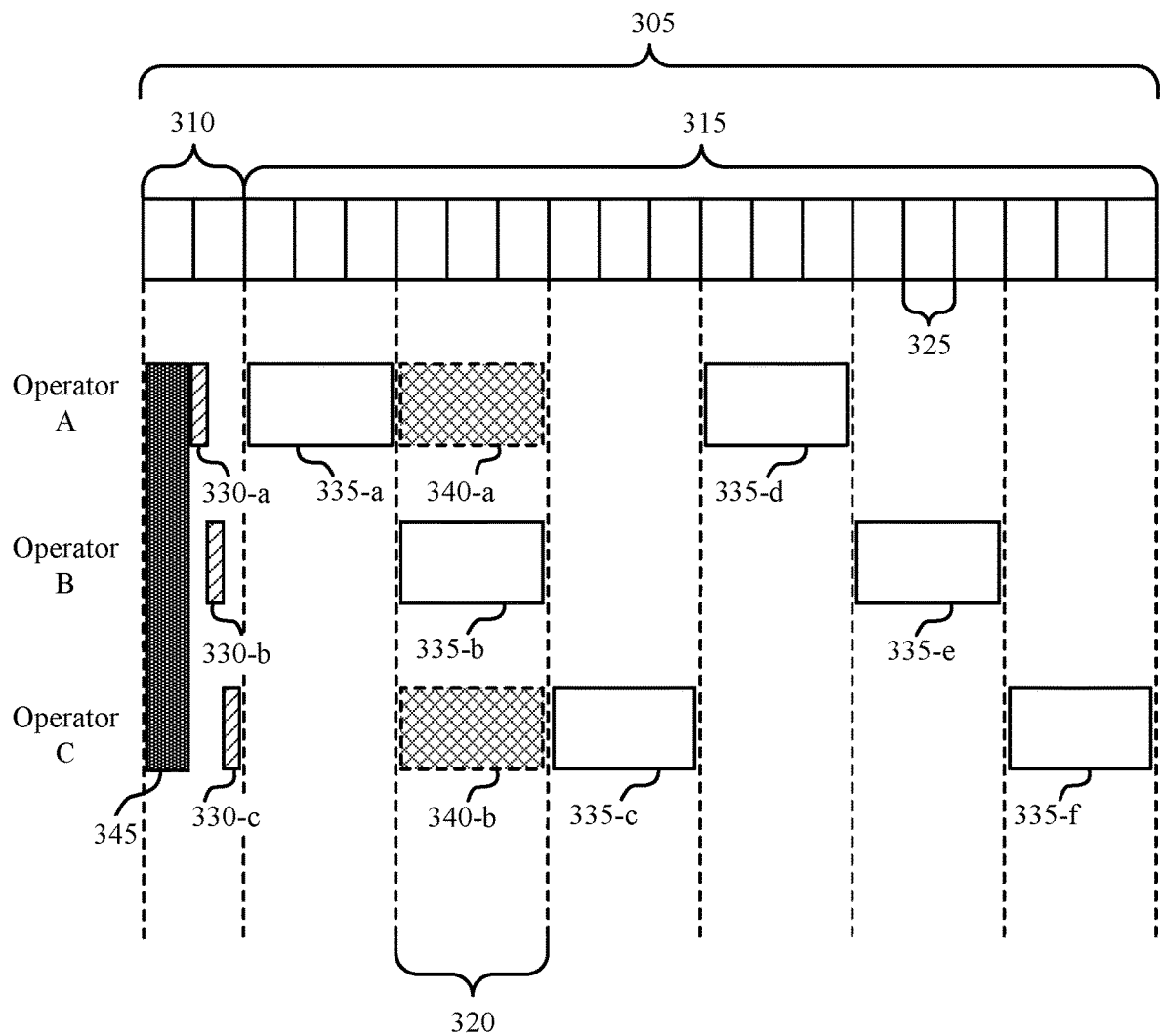
FIG. 3 illustrates an example of a timing diagram that supports coordinated resource discovery in accordance with aspects of the present disclosure.

FIG. 3 illustrates an example of a timing diagram 300 for coordinated resource discovery. The timing diagram 300 includes a frame 305, which may represent a fixed duration of time (e.g., 10 ms, 20 ms, 35 ms). Frame 305 may be repeated for a given communication session and may be used by a wireless system such as wireless communications systems 100 and 200 described with reference to FIGS. 1-2. The frame 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the frame 305 may be further divided into a plurality of subframes 325 with a fixed duration (e.g., 0.5 ms, 1 ms). While timing diagram 300 illustrates three different network operating entities (e.g., Operator A, Operator B, Operator C), the number of network operating entities using the frame 305 for coordinated communications may be greater than or fewer than the number illustrated in timing diagram 300.

The A-INT 310 may be a dedicated interval of the frame 305 that is reserved for exclusive communications by the network operating entities. In some examples, each network operating entity may be allocated certain resources within the A-INT 310 for exclusive communications. For example, resources 330-*a* may be reserved for exclusive communications by Operator A, resources 330-*b* may be reserved for exclusive communications by Operator B, and resources 330-*c* may be reserved for exclusive communications by Operator C. In some cases, since the resources 330-*a* are reserved for exclusive communications by Operator A, neither Operator B nor Operator C may communicate during resources 330-*a*, even if Operator A chooses not to communicate during those resources. That is, access to exclusive resources is limited to the designated network operator. Similar restrictions may apply to resources 330-*b* for Operator B and resources 330-*c* for Operator C. The wireless nodes of Operator A (e.g, UEs 115 or base stations 105) may communicate information desired during their exclusive resources 330-*a*, such as control information or data.

When communicating over an exclusive resource, a network operating entity may not need to perform any medium sensing procedures (e.g., LBT or CCA) because the network operating entity may be aware that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 may be used to transmit control information, such as synchronization signals (e.g., SYNC signals including PSS, SSS, one or more SIBs, paging information (e.g., PBCH messages), or random access information (e.g., random access channel (RACH) signals). In some examples, one or more of the wireless nodes associated with a network operating entity may concurrently transmit during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-*a* may be prioritized for use by Operator A and may therefore be referred to as a G-INT for Operator A (e.g., G-INT-OpA). Similarly, resources 335-*b* may be prioritized for Operator B, resources 335-*c* may be prioritized for Operator C, resources 335-*d* may be prioritized for Operator A, resources 335-*e* may be prioritized for Operator B, and resources 335-*f* may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the frame 305. This partitioning of data may be an example of time division multiplexing (TDM). Also, when resources appear in the same sub-interval (e.g., resources 340-*a* and resources 335-*b*), these resources represent the same time resources with respect to the frame 305 (e.g., the resources may occupy the same sub-interval 320), but the resources are separately designated to illustrate that the same time resources can be classified differently for different operators.

When resources are assigned with priority (e.g., a G-INT) for a certain network operating entity, that network operating entity may communicate using those resources without having to wait or perform any medium sensing procedures such as LBT, or CCA. For example, the wireless nodes of Operator A may be free to communicate data or control information during resources 335-*a* without interference from the wireless nodes of Operator B or Operator C.

In some cases, a network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In timing diagram 300, synchronization may be used to allow multiple operators to coordinate the allocation of resources to multiple network operating entities. Thus, in some examples, each A-INT 310 may be preceded by a common preamble 345 used to synchronize one or more nodes with frame 305. Common preamble 345 may be transmitted by all or a subset of nodes (e.g., eNBs 105 or UEs 115), each of which may be associated with one or more network operating entities. Communication of the common preamble 345 may enable synchronization of a receiving node operating in a wireless communication system employing timing diagram 300 to align in time with frame 305.

In some examples, the common preamble 345 may include a common signature, which may be the same or similar across all network operating entities that have been allocated resources within frame 305. The common preamble 345 may additionally or alternatively include an indication of the length or span of time until the end of the corresponding A-INT 310. This indication may be used by a node receiving the common preamble 345 to determine the beginning of the arbitration interval 315, where prioritized or unassigned resource designations may occur.

As mentioned above, each network operating entity may have exclusive resources 330 to transmit operator specific information via network entity-specific preambles. In some examples, network entity-specific preambles may be transmitted using resources 330-a, 330-b, and 330-c following common preamble 345. The resources 330 allocated to multiple network operating entities may be non-overlapping. For example, the resources 330 may be designated for use in disjointed segments of time (e.g., sub-intervals, symbols, time slots) such that a single network operating entity is the only network operating entity designated to a given sub-interval. In other words, the resources 330 may be non-overlapping and may be exclusively allocated for only one network operating entity.

In some examples, nodes associated with the same network operating entity may operate at the same time using designated resources 330. For instance, multiple nodes may be associated with Operator A and may transmit or receive an Operator A-specific preamble using resources 330-a, while network operating entity-specific preambles for Operator B and Operator C may be transmitted or received using resources 330-b and 330-c, respectively.

Reception of one or more network operating entity-specific preambles may provide nodes associated with a network operating entity the ability to detect resources and other nodes associated with the network operating entity. In some cases, the network operating entity-specific preambles may provide a node the ability to identify neighboring nodes that are associated with a different network operating entity. A network operating entity-specific preamble may also include priority information. The priority information may indicate a relative access priority for one or more G-INTs, as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that more or less network operating entities may be configured to operate in a coordinated manner as described above. In some cases, the location of the G-INT, O-INT, or A-INT within frame 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

Furthermore, it should be understood that the coordination framework described with reference to FIG. 3 is for illustration purposes only. For example, the duration of frame 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Figure 4:
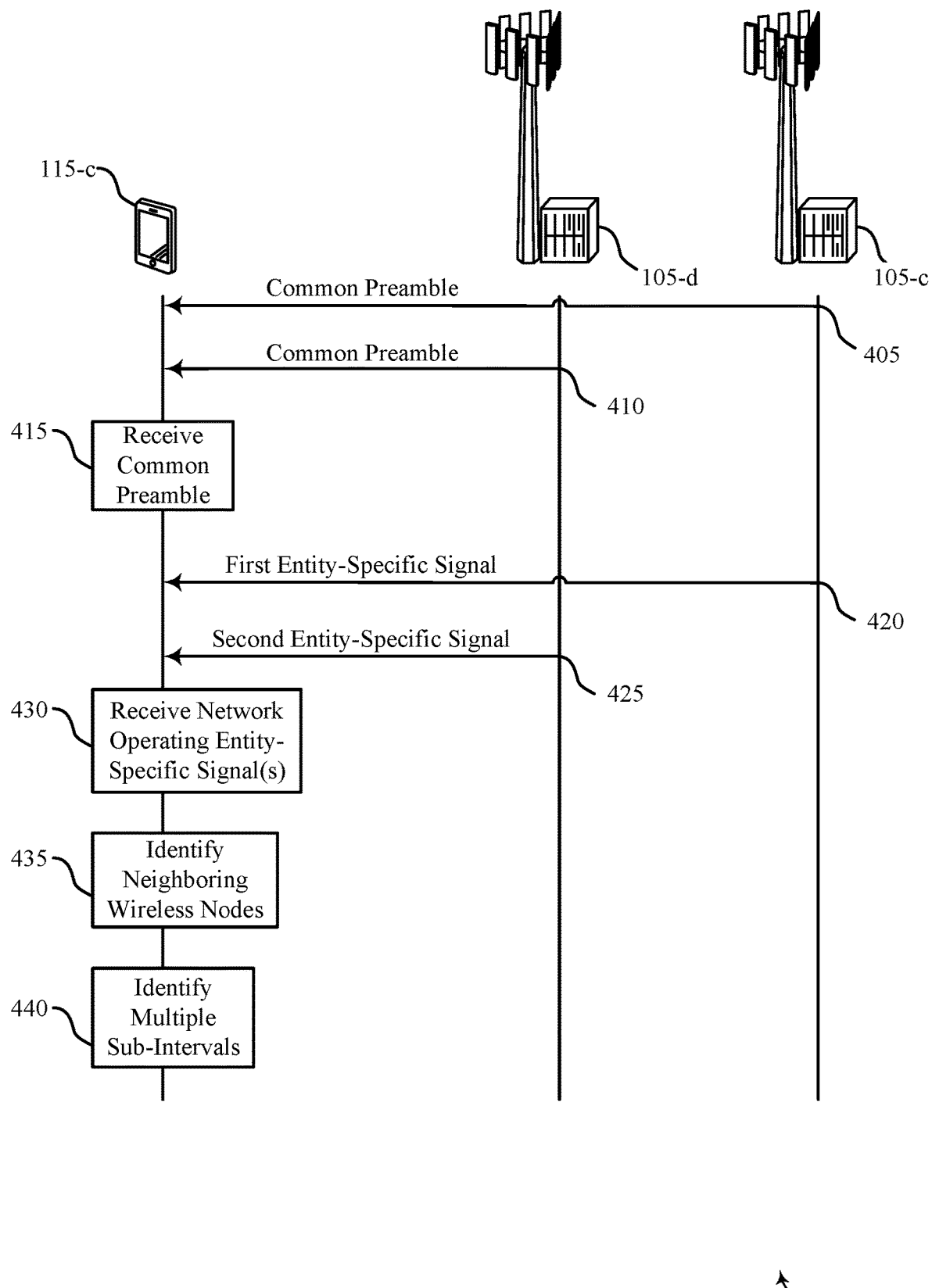
FIG. 4 illustrates an example of a process flow that supports coordinated resource discovery in accordance with aspects of the present disclosure.

FIG. 4 illustrates an example of a process flow 400 for coordinated resource discovery. Process flow 400 may include a base station 105-c, a base station 105-d, and a UE 115-c, which may be examples of the corresponding devices described with reference to FIGS. 1-3. While base station 105-c, base station 105-d, and UE 115-c are shown in this example, any other combination of wireless nodes (e.g., UEs 115, base stations 105, nodes of core network 130) may be used in process flow 400.

Process flow 400 may be implemented in a wireless communications system employing multiple operating entities that share a radio frequency spectrum. For example, base station 105-c may function as part or all of a node associated with a first network operating entity, while base station 105-d may function as part or all of a node associated with a second network operating entity.

At 405 and 410, nodes such as base station 105-c and base station 105-d associated with first and second network operating entities, respectively, may transmit a common preamble using a shared radio frequency spectrum band. The common preamble may be transmitted using the shared radio frequency spectrum and may be used for synchronizing with the frame. In some instances, the common preamble may include synchronization information for the frame that is common to the plurality of network operating entities. The common preamble may further include information related to the acquisition sub-interval of the frame. Such information may include at least one of a beginning of the acquisition sub-interval, an end of the acquisition sub-interval, a duration of the acquisition sub-interval, or combinations thereof. The common preamble may also include a signature common to each of the plurality of network operating entities.

At 415, UE 115-c receives the common preamble and may use the common preamble to synchronize in time with base station 105-c and 105-d of the wireless communications system. As mentioned above, the common preamble may indicate an acquisition sub-interval, which may be used by UE 115-c to identify resources designated for exclusive use by the first network operating entity and/or the second network operating entity.

At 420, after the common preamble is transmitted at 405 and 410, base station 105-c may transmit a first network entity-specific signal and at 425, base station 105-d may transmit a second network entity-specific signal. The first and second network entity-specific signals may be transmitted using the shared radio frequency spectrum, but may be transmitted at different times within an acquisition sub-interval of a frame. Thus, the UE 115-c may choose to decode only one of the first and second network operating entity-specific signals. For instance, at 430, UE 115-c may receive one or more network operating entity-specific signals. If the UE 115-c is only capable of operating according to the first network operating entity, the UE 115-c may choose to receive and decode only the first network operating entity-specific signal transmitted at 420. However, if the UE 115-c is capable of operating according to both the first and second network operating entities, the UE 115-c may choose to receive and decode both the first and second network operating entity-specific signals. Decoding of the first and second network operating entity-specific signals may be done blindly, in accordance with some predetermined schedule, or based on information included in the common preamble received at 415.

Using one or more of the network operating entity-specific signals, UE 115-c may receive, determine, or otherwise obtain priority information associated with the first and/or second network operating entities. The priority information may indicate a priority level associated with each of the first and second network operating entities which may be used in accessing O-INTs, as described above.

At 435, based on the first and/or second network operating entity-specific signals, UE 115-c may identify one or more neighboring wireless nodes operating according to the first and/or the second network operating entities.

At 440, UE 115-c may identify multiple sub-intervals of a frame used for communicating using the shared radio frequency spectrum. In some examples, UE 115-c may identify sub-intervals designated for prioritized use by one of the first and second network operating entities, or may identify multiple sub-intervals for opportunistic use by the first and/or second network operating entities. Multiple sub-intervals designated for use by different entities may be non-overlapping or disjoint and the identification of multiple sub-intervals may be based at least in part on the common preamble, the first or second network operating entity-specific signals, or a combination thereof.

Figure 5:
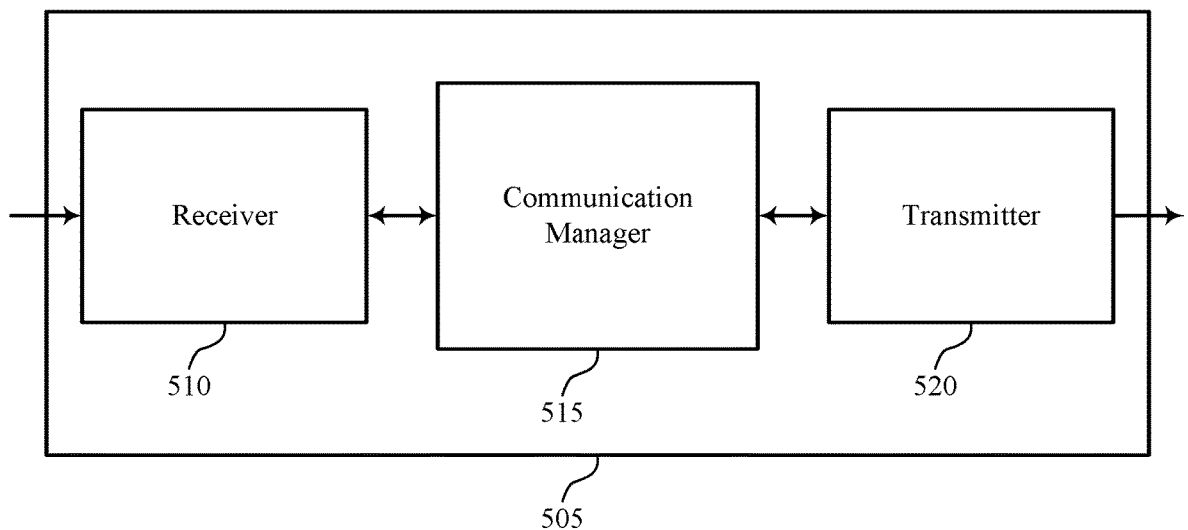
FIGS. 5 through 7 show block diagrams of a device that supports coordinated resource discovery in accordance with aspects of the present disclosure.

FIG. 5 shows a block diagram 500 of a wireless device 505 that supports coordinated resource discovery in accordance with various aspects of the present disclosure. Wireless device 505 may be an example of aspects of a UE 115 or base station 105 as described with reference to FIG. 1. Wireless device 505 may include receiver 510, communication manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to coordinated resource discovery, etc.). Information may be passed on to other components of the device. The receiver 510 may be an example of aspects of the transceiver 835 described with reference to FIG. 8.

Communication manager 515 may be an example of aspects of the communication manager 815 described with reference to FIG. 8.

Communication manager 515 may receive, within a frame in a shared radio frequency spectrum band shared by a set of network operating entities, a common preamble for synchronizing the set of network operating entities with the frame. In some cases, the common preamble may include synchronization information for the frame common to the set of network operating entities. Communication manager 515 may also receive, during an acquisition sub-interval of the frame and after receipt of the common preamble, one or more network operating entity-specific signals, and identify, based on the one or more network operating entity-specific signals, neighboring wireless nodes. Communication manager 515 may receive, in a shared radio frequency spectrum band shared by a set of network operating entities, one or more network operating entity-specific signals, and identify, based on the one or more network operating entity-specific signals, neighboring wireless nodes. In some examples, communication manager 515 may receive, within a frame in a shared radio frequency spectrum band shared by a plurality of network operating entities, a common preamble for synchronizing the plurality of network operating entities with the frame. In some examples, one or more network operating entity-specific signals are received during an acquisition sub-interval of the frame and after receipt of the common preamble.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas.

Figure 6:
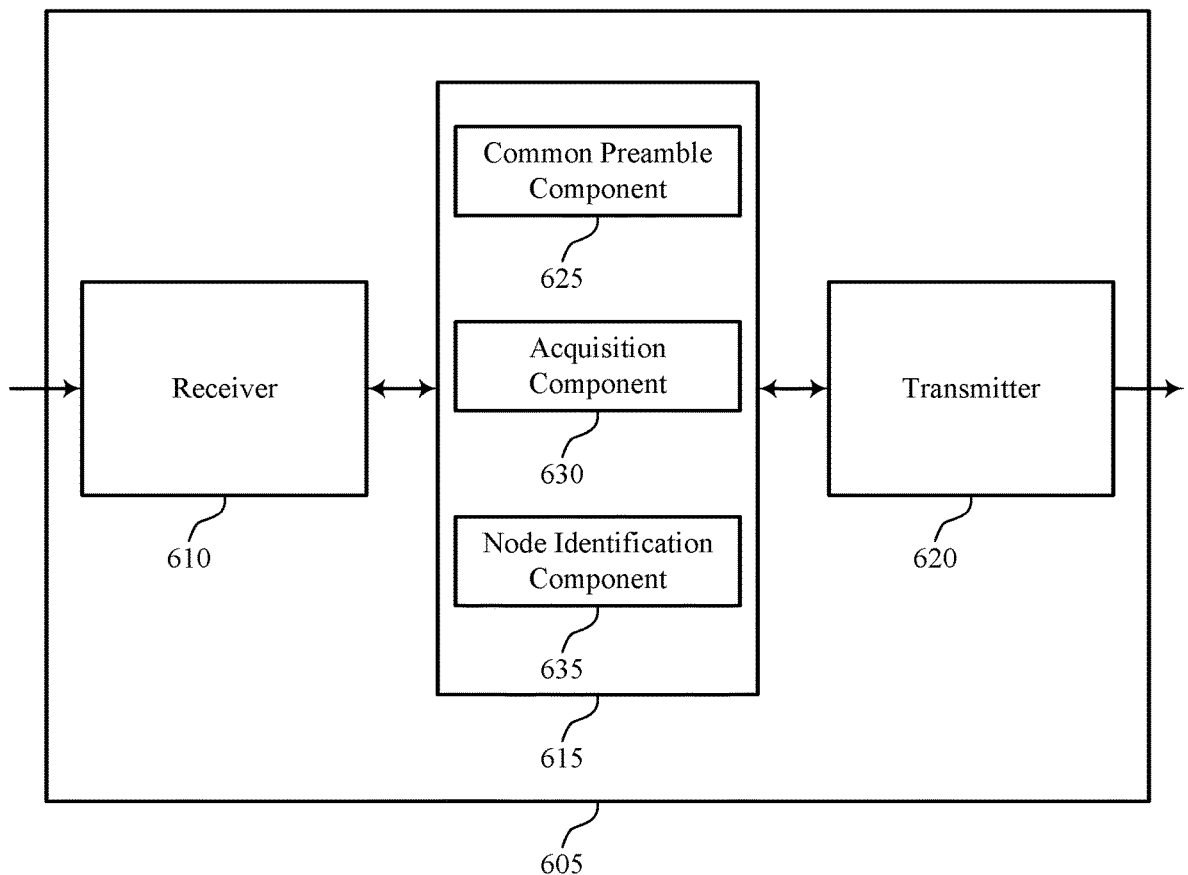

FIG. 6 shows a block diagram 600 of a wireless device 605 that supports coordinated resource discovery in accordance with various aspects of the present disclosure. Wireless device 605 may be an example of aspects of a wireless device 505 or a UE 115 or base station 105 as described with reference to FIGS. 1 and 5. Wireless device 605 may include receiver 610, communication manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to coordinated resource discovery, etc.). Information may be passed on to other components of the device. The receiver 610 may be an example of aspects of the transceiver 835 described with reference to FIG. 8.

Communication manager 615 may be an example of aspects of the communication manager 815 described with reference to FIG. 8.

Communication manager 615 may also include common preamble component 625, acquisition component 630, and node identification component 635.

Common preamble component 625 may receive, within a frame in a shared radio frequency spectrum band shared by a set of network operating entities, a common preamble for synchronizing with the frame. In some instances, the common preamble may include synchronization information for the frame common to the set of network operating entities. Common preamble component 625 may receive the common preamble from multiple wireless nodes, where each of the multiple wireless nodes operates according to at least one of the set of network operating entities. In some aspects, the common preamble includes information related to the acquisition sub-interval of the frame, information related to synchronizing with the frame, or combinations thereof. According to some cases, the information related to the acquisition sub-interval of the frame includes at least one of a beginning of the acquisition sub-interval, an end of the acquisition sub-interval, a duration of the acquisition sub-interval, or combinations thereof. The common preamble may include a signature common to each of the set of network operating entities.

Acquisition component 630 may receive, during an acquisition sub-interval of the frame and after receipt of the common preamble, one or more network operating entity-specific signals. In some examples, acquisition component 630 may receive, in a shared radio frequency spectrum band shared by a set of network operating entities, one or more network operating entity-specific signals. In some examples, one or more network operating entity-specific signals are received during an acquisition sub-interval of the frame and after receipt of the common preamble.

Node identification component 635 may identify, based on the one or more network operating entity-specific signals, neighboring wireless nodes. In some cases, the nodes from the same network operating entity share the same network operating entity-specific signal.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas.

Figure 7:
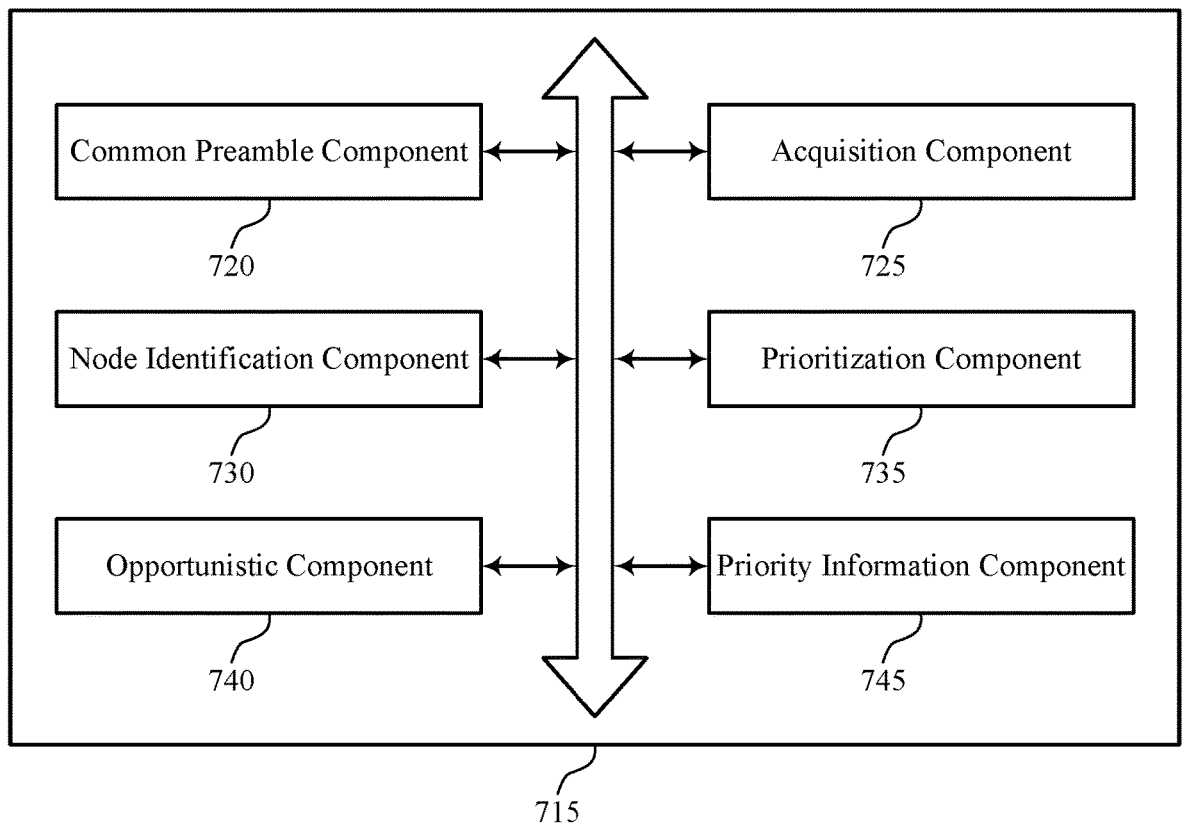

FIG. 7 shows a block diagram 700 of a communication manager 715 that supports coordinated resource discovery in accordance with various aspects of the present disclosure. The communication manager 715 may be an example of aspects of a communication manager 515, a communication manager 615, or a communication manager 815 described with reference to FIGS. 5, 6, and 8. The communication manager 715 may include common preamble component 720, acquisition component 725, node identification component 730, prioritization component 735, opportunistic component 740, and priority information component 745. Each of these modules may communicate, directly or indirectly, with one another (e.g., via one or more buses).

Common preamble component 720 may receive, within a frame in a shared radio frequency spectrum band shared by a set of network operating entities, a common preamble for synchronizing with the frame. In some instances, the common preamble may include synchronization information for the frame common to the set of network operating entities. In some aspects, common preamble component 720 may receive the common preamble from multiple wireless nodes, where each of the multiple wireless nodes operates according to at least one of the set of network operating entities. According to some cases, the common preamble includes information related to the acquisition sub-interval of the frame, information related to synchronizing with the frame, or combinations thereof. In some examples, the information related to the acquisition sub-interval of the frame includes at least one of a beginning of the acquisition sub-interval, an end of the acquisition sub-interval, a duration of the acquisition sub-interval, or combinations thereof. The common preamble may include a signature common to each of the set of network operating entities.

Acquisition component 725 may receive, during an acquisition sub-interval of the frame and after receipt of the common preamble, one or more network operating entity-specific signals. In some examples, acquisition component 725 may receive, in a shared radio frequency spectrum band shared by a set of network operating entities, one or more network operating entity-specific signals. In some examples, one or more network operating entity-specific signals are received during an acquisition sub-interval of the frame and after receipt of the common preamble.

Node identification component 730 may identify, based on the one or more network operating entity-specific signals, neighboring wireless nodes. In some cases, the nodes from the same network operating entity share the same network operating entity-specific signal.

Prioritization component 735 may identify multiple sub-intervals of the frame, each of the multiple sub-intervals designated for prioritized use by one of the set of network operating entities. Prioritization component 735 may also identify multiple sub-intervals based on the common preamble, the one or more network operating entity-specific signals, or combinations thereof. In some cases, the multiple sub-intervals are non-overlapping. In some cases, the multiple sub-intervals are disjoint.

Opportunistic component 740 may identify multiple sub-intervals of the frame, each of the multiple sub-intervals designated for opportunistic use by one of the set of network operating entities.

Priority information component 745 may receive priority information associated with one or more network operating entities of the set of network operating entities. In some cases, the priority information indicates a priority level for each of the one or more network operating entities for using one or more of the multiple sub-intervals.

Figure 8:
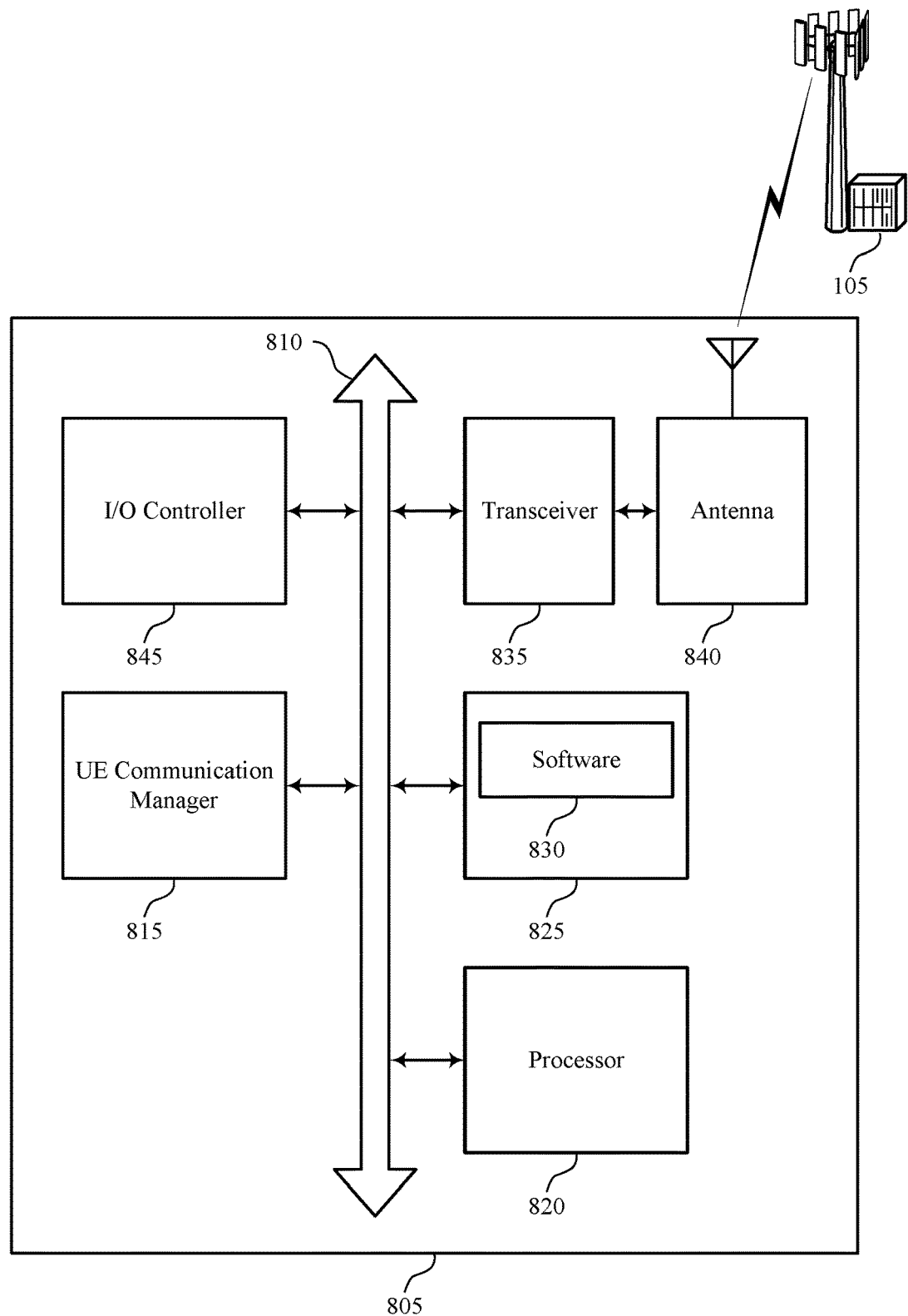
FIG. 8 illustrates a block diagram of a system including a user equipment (UE) that supports coordinated resource discovery in accordance with aspects of the present disclosure.

FIG. 8 shows a diagram of a system 800 including a device 805 that supports coordinated resource discovery in accordance with various aspects of the present disclosure. Device 805 may be an example of or include the components of wireless device 505, wireless device 605, or a UE 115 as described above, e.g., with reference to FIGS. 1, 5 and 6. Device 805 may include components for bi-directional voice and data communications including components for transmitting and receiving communications, including UE communication manager 815, processor 820, memory 825, software 830, transceiver 835, antenna 840, and I/O controller 845. These components may be in electronic communication via one or more busses (e.g., bus 810). Device 805 may communicate wirelessly with one or more base stations 105.

Processor 820 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting coordinated resource discovery).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support coordinated resource discovery. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system.

Figure 9:
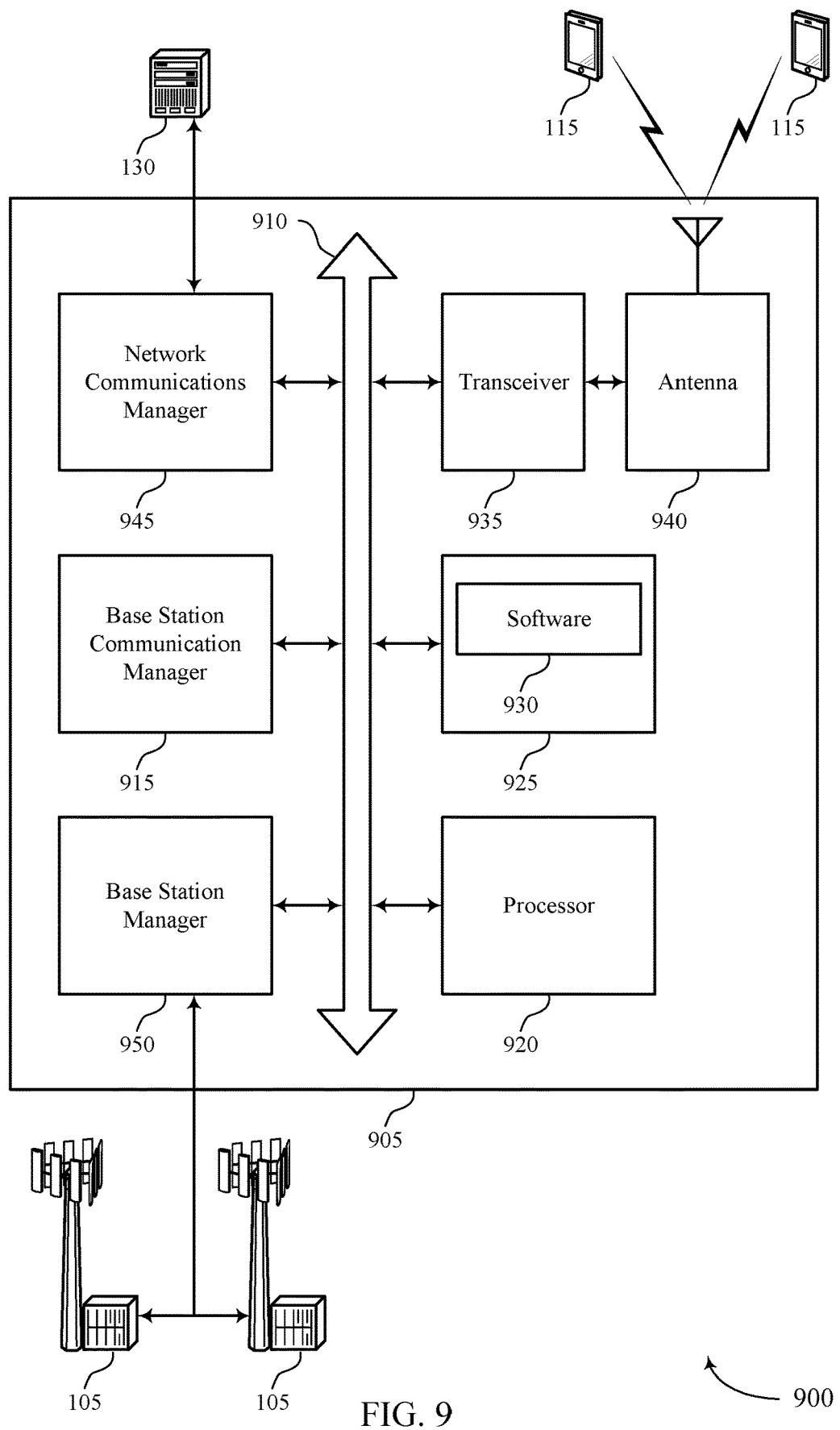
FIG. 9 illustrates a block diagram of a system including a base station that supports coordinated resource discovery in accordance with aspects of the present disclosure.

FIG. 9 shows a diagram of a system 900 including a device 905 that supports coordinated resource discovery in accordance with various aspects of the present disclosure. Device 905 may be an example of or include the components of wireless device 605, wireless device 705, or a base station 105 as described above, e.g., with reference to FIGS. 1, 6 and 7. Device 905 may include components for bi-directional voice and data communications including components for transmitting and receiving communications, including base station communication manager 915, processor 920, memory 925, software 930, transceiver 935, antenna 940, network communications manager 945, and base station manager 950. These components may be in electronic communication via one or more busses (e.g., bus 910). Device 905 may communicate wirelessly with one or more UEs 115.

Processor 920 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting coordinated resource discovery).

Memory 925 may include RAM and ROM. The memory 925 may store computer-readable, computer-executable software 930 including instructions that, when executed, cause the processor to perform various functions described herein. In some cases, the memory 925 may contain, among other things, a BIOS which may control basic hardware and/or software operation such as the interaction with peripheral components or devices.

Software 930 may include code to implement aspects of the present disclosure, including code to support coordinated resource discovery. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

Network communications manager 945 may manage communications with the core network (e.g., via one or more wired backhaul links). For example, the network communications manager 945 may manage the transfer of data communications for client devices, such as one or more UEs 115.

Base station manager 950 may manage communications with other base station 105, and may include a controller or scheduler for controlling communications with UEs 115 in cooperation with other base stations 105. For example, the base station manager 950 may coordinate scheduling for transmissions to UEs 115 for various interference mitigation techniques such as beamforming or joint transmission. In some examples, base station manager 950 may provide an X2 interface within an LTE/LTE-A wireless communication network technology to provide communication between base stations 105. Base station communications manager 915 may provide other interfaces compatible with NR or other next-generation wireless communication network technology.

Figure 10:
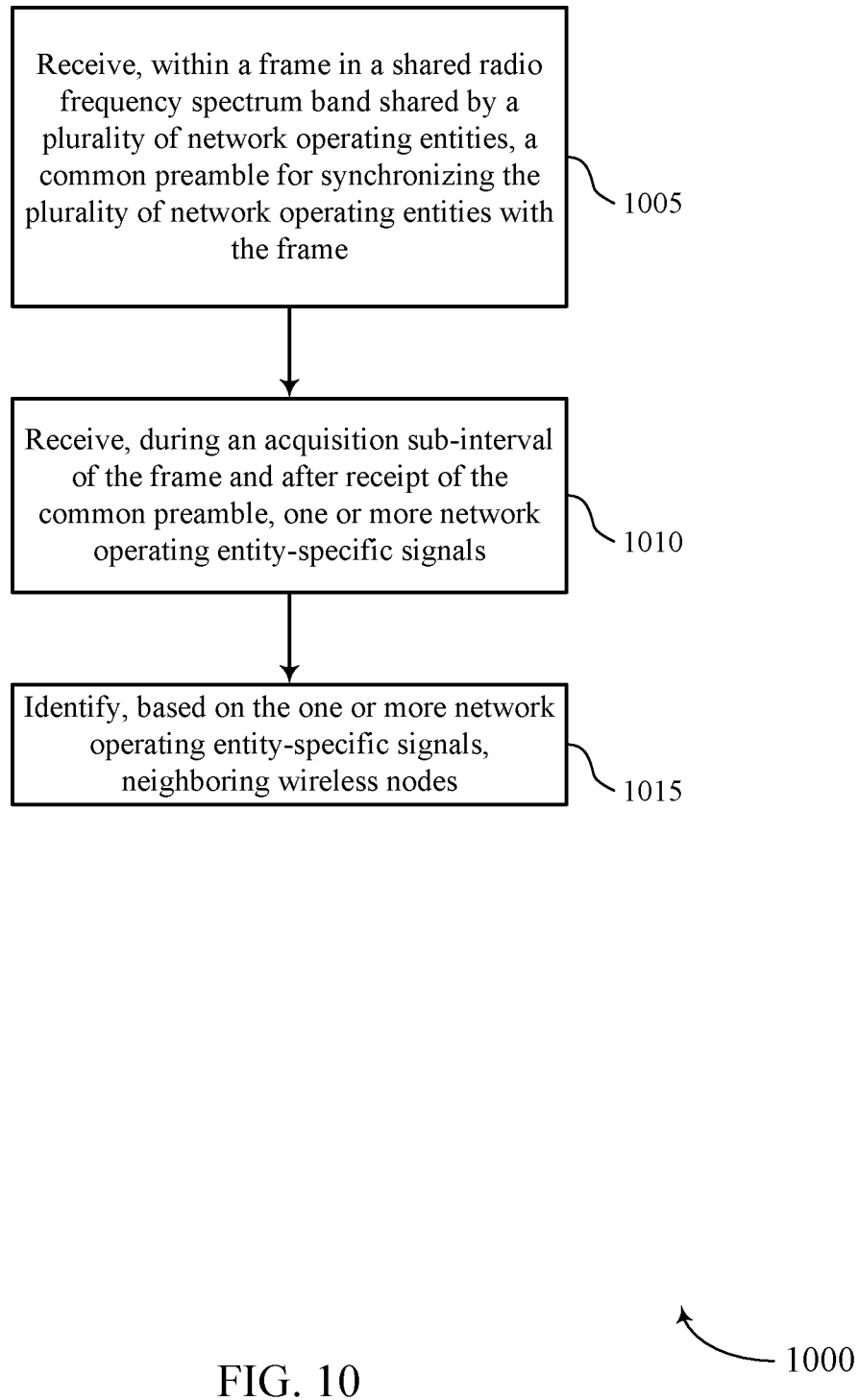
FIGS. 10 through 13 illustrate methods for coordinated resource discovery in accordance with aspects of the present disclosure.

FIG. 10 shows a flowchart illustrating a method 1000 for coordinated resource discovery in accordance with various aspects of the present disclosure. The operations of method 1000 may be implemented by a UE 115 or base station 105 or its components as described herein. For example, the operations of method 1000 may be performed by a communication manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1005 the UE 115 or base station 105 may receive, within a frame in a shared radio frequency spectrum band shared by a plurality of network operating entities, a common preamble for synchronizing the plurality of network operating entities with the frame. The operations of block 1005 may be performed according to the methods described with reference to FIGS. 1 through 4. In certain examples, aspects of the operations of block 1005 may be performed by a common preamble component as described with reference to FIGS. 5 through 7.

At block 1010 the UE 115 or base station 105 may receive, during an acquisition sub-interval of the frame and after receipt of the common preamble, one or more network operating entity-specific signals. The operations of block 1010 may be performed according to the methods described with reference to FIGS. 1 through 4. In certain examples, aspects of the operations of block 1010 may be performed by an acquisition component as described with reference to FIGS. 5 through 7.

At block 1015 the UE 115 or base station 105 may identify, based on the one or more network operating entity-specific signals, neighboring wireless nodes. The operations of block 1015 may be performed according to the methods described with reference to FIGS. 1 through 4. In certain examples, aspects of the operations of block 1015 may be performed by a node identification component as described with reference to FIGS. 5 through 7.

Figure 11:
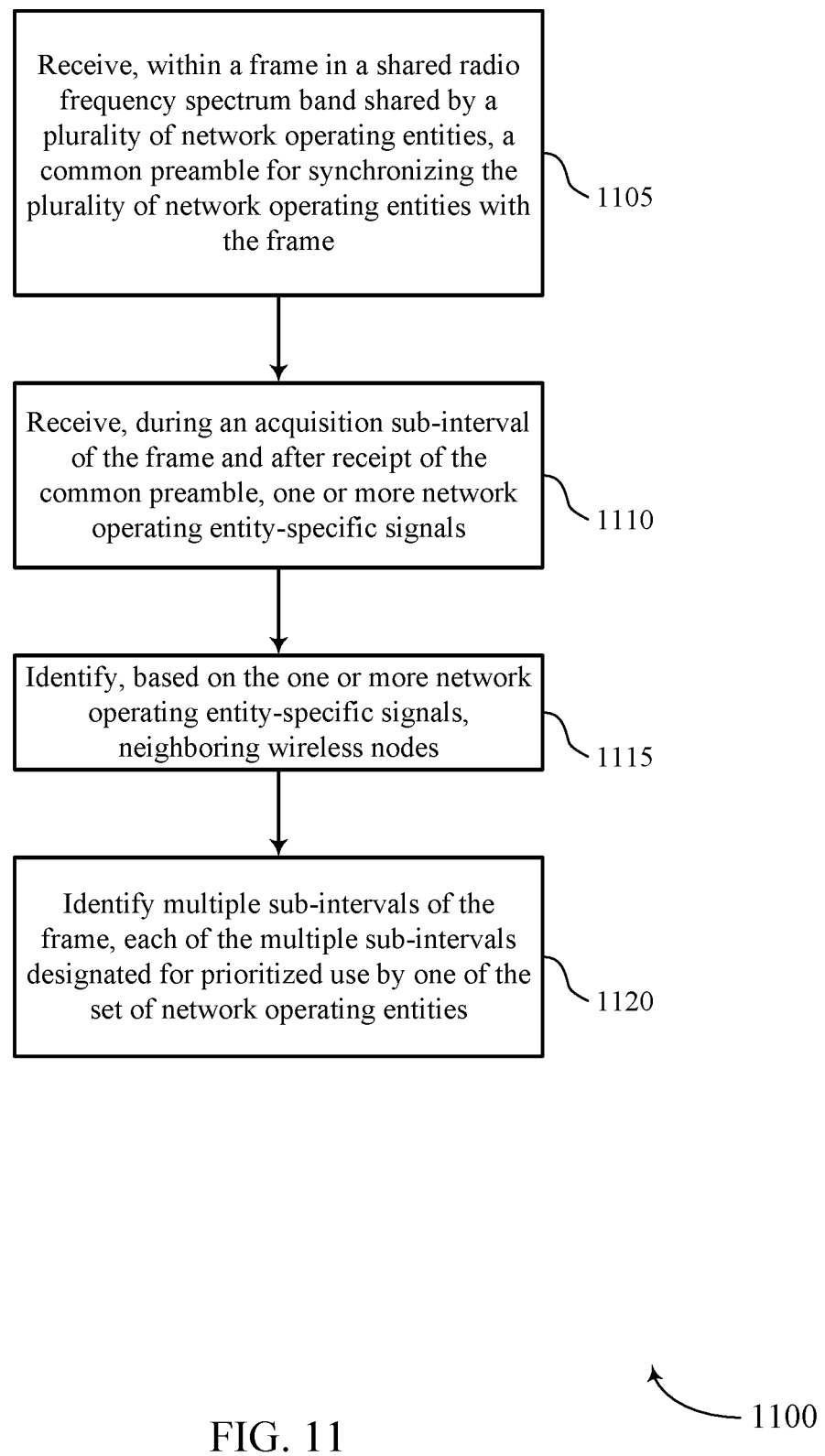

FIG. 11 shows a flowchart illustrating a method 1100 for coordinated resource discovery in accordance with various aspects of the present disclosure. The operations of method 1100 may be implemented by a UE 115 or base station 105 or its components as described herein. For example, the operations of method 1100 may be performed by a communication manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1105 the UE 115 or base station 105 may receive, within a frame in a shared radio frequency spectrum band shared by a plurality of network operating entities, a common preamble for synchronizing the plurality of network operating entities with the frame. The operations of block 1105 may be performed according to the methods described with reference to FIGS. 1 through 4. In certain examples, aspects of the operations of block 1105 may be performed by a common preamble component as described with reference to FIGS. 5 through 7.

At block 1110 the UE 115 or base station 105 may receive, during an acquisition sub-interval of the frame and after receipt of the common preamble, one or more network operating entity-specific signals. The operations of block 1110 may be performed according to the methods described with reference to FIGS. 1 through 4. In certain examples, aspects of the operations of block 1110 may be performed by an acquisition component as described with reference to FIGS. 5 through 7.

At block 1115 the UE 115 or base station 105 may identify, based on the one or more network operating entity-specific signals, neighboring wireless nodes. The operations of block 1115 may be performed according to the methods described with reference to FIGS. 1 through 4. In certain examples, aspects of the operations of block 1115 may be performed by a node identification component as described with reference to FIGS. 5 through 7.

At block 1120 the UE 115 or base station 105 may identify multiple sub-intervals of the frame, each of the multiple sub-intervals designated for prioritized use by one of the plurality of network operating entities. The operations of block 1120 may be performed according to the methods described with reference to FIGS. 1 through 4. In certain examples, aspects of the operations of block 1120 may be performed by a prioritization component as described with reference to FIGS. 5 through 7. In some cases, the UE 115 or base station 105 may identify multiple sub-intervals is based at least in part on the common preamble, the one or more network operating entity-specific signals, or combinations thereof.

Figure 12:
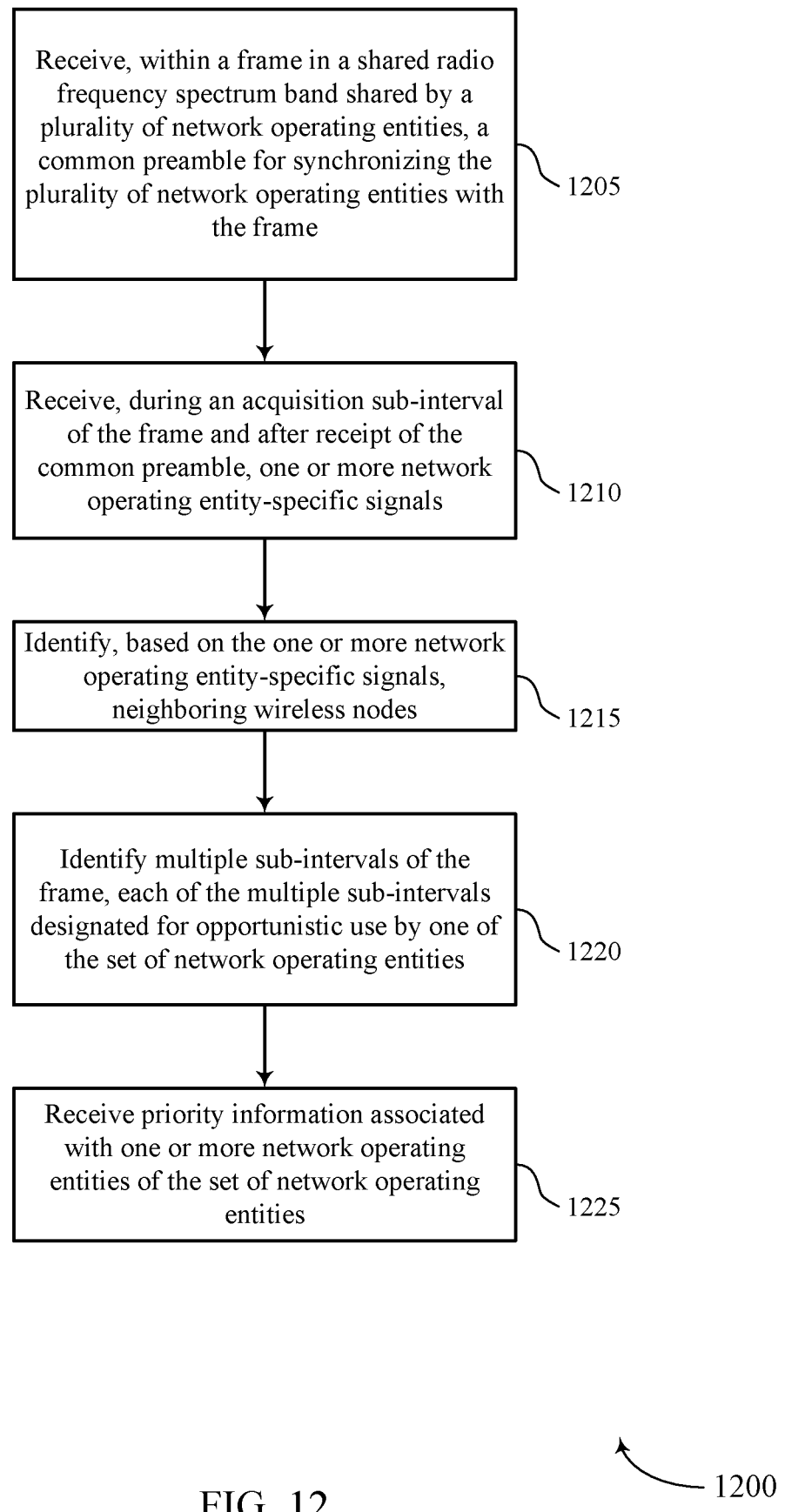

FIG. 12 shows a flowchart illustrating a method 1200 for coordinated resource discovery in accordance with various aspects of the present disclosure. The operations of method 1200 may be implemented by a UE 115 or base station 105 or its components as described herein. For example, the operations of method 1200 may be performed by a communication manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1205 the UE 115 or base station 105 may receive, within a frame in a shared radio frequency spectrum band shared by a plurality of network operating entities, a common preamble for synchronizing the plurality of network operating entities with the frame. The operations of block 1205 may be performed according to the methods described with reference to FIGS. 1 through 4. In certain examples, aspects of the operations of block 1205 may be performed by a common preamble component as described with reference to FIGS. 5 through 7.

At block 1210 the UE 115 or base station 105 may receive, during an acquisition sub-interval of the frame and after receipt of the common preamble, one or more network operating entity-specific signals. The operations of block 1210 may be performed according to the methods described with reference to FIGS. 1 through 4. In certain examples, aspects of the operations of block 1210 may be performed by an acquisition component as described with reference to FIGS. 5 through 7.

At block 1215 the UE 115 or base station 105 may identify, based on the one or more network operating entity-specific signals, neighboring wireless nodes. The operations of block 1215 may be performed according to the methods described with reference to FIGS. 1 through 4. In certain examples, aspects of the operations of block 1215 may be performed by a node identification component as described with reference to FIGS. 5 through 7.

At block 1220 the UE 115 or base station 105 may identify multiple sub-intervals of the frame, each of the multiple sub-intervals designated for opportunistic use by one of the plurality of network operating entities. The operations of block 1220 may be performed according to the methods described with reference to FIGS. 1 through 4. In certain examples, aspects of the operations of block 1220 may be performed by an opportunistic component as described with reference to FIGS. 5 through 7.

At block 1225 the UE 115 or base station 105 may receive priority information associated with one or more network operating entities of the plurality of network operating entities. The operations of block 1225 may be performed according to the methods described with reference to FIGS. 1 through 4. In certain examples, aspects of the operations of block 1225 may be performed by a priority information component as described with reference to FIGS. 5 through 7.

Figure 13:
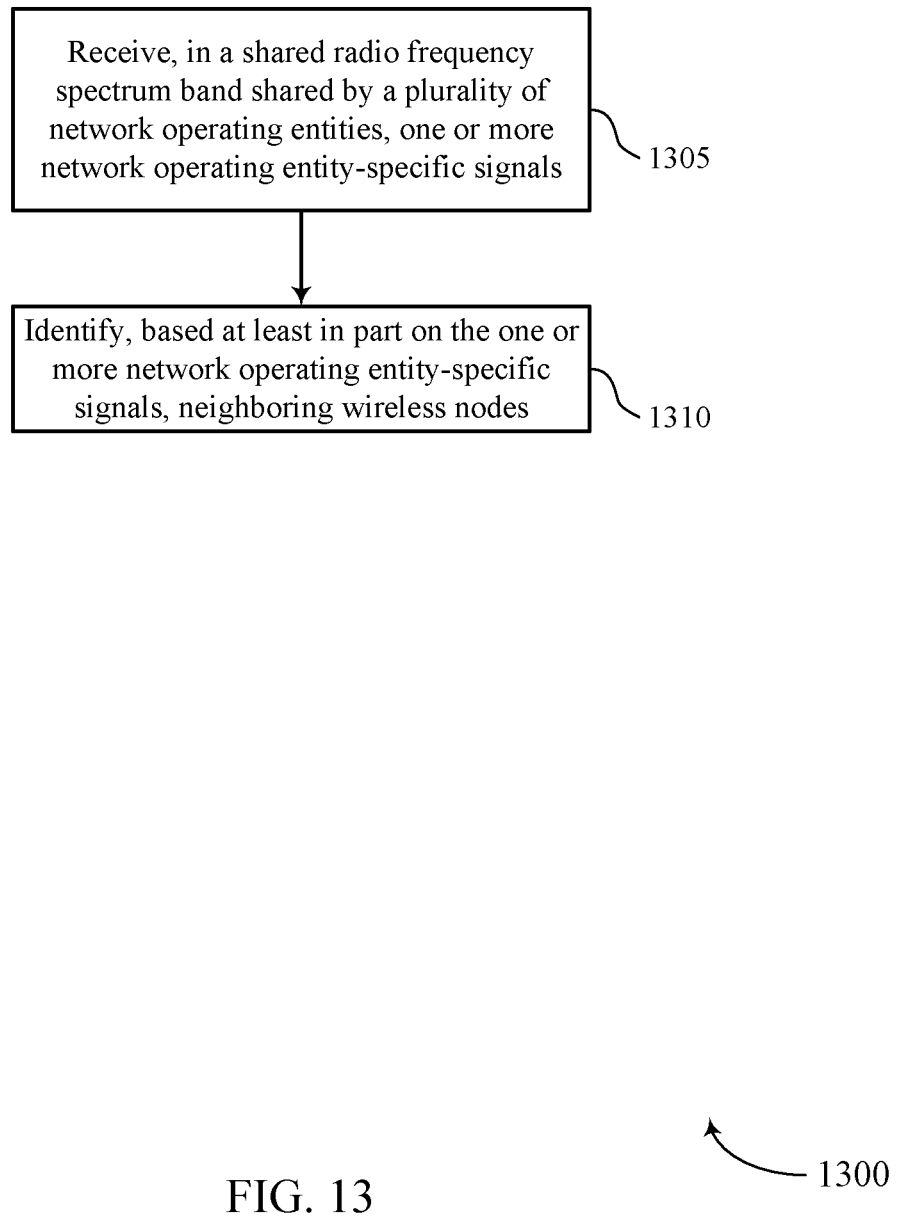

FIG. 13 shows a flowchart illustrating a method 1300 for coordinated resource discovery in accordance with various aspects of the present disclosure. The operations of method 1300 may be implemented by a UE 115 or base station 105 or its components as described herein. For example, the operations of method 1300 may be performed by a communication manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1305 the UE 115 or base station 105 may receive, in a shared radio frequency spectrum band shared by a plurality of network operating entities, one or more network operating entity-specific signals. The operations of block 1305 may be performed according to the methods described with reference to FIGS. 1 through 4. In certain examples, aspects of the operations of block 1305 may be performed by an acquisition component as described with reference to FIGS. 5 through 7.

At block 1310 the UE 115 or base station 105 may identify, based on the one or more network operating entity-specific signals, neighboring wireless nodes. The operations of block 1310 may be performed according to the methods described with reference to FIGS. 1 through 4. In certain examples, aspects of the operations of block 1310 may be performed by a node identification component as described with reference to FIGS. 5 through 7. In some examples, one or more network operating entity-specific signals are received during an acquisition sub-interval of the frame and after receipt of the common preamble.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of UMTS that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:

receiving, within a frame in a shared radio frequency spectrum band shared by a plurality of network operating entities, a common preamble for discovery of resources and priority timing synchronization of the plurality of network operating entities with the frame, the common preamble comprising timing information for an acquisition sub-interval of the frame;

receiving, during the acquisition sub-interval of the frame and after receipt of the common preamble, one or more network operating entity-specific signals;

identifying, based on the one or more network operating entity-specific signals, neighboring wireless nodes;

identifying multiple sub-intervals of the frame, each of the multiple sub-intervals designated for opportunistic use by one of the plurality of network operating entities; and receiving priority information associated with one or more network operating entities of the plurality of network operating entities, wherein the priority information indicates a priority level for each of the one or more network operating entities for using one or more of the multiple sub-intervals.

2. The method of claim 1, further comprising:
receiving the common preamble from multiple wireless nodes, wherein each of the multiple wireless nodes operates according to at least one of the plurality of network operating entities.

3. The method of claim 1, wherein the common preamble comprises synchronization information for the acquisition sub-interval of the frame.

4. The method of claim 3, wherein the synchronization information for the acquisition sub-interval of the frame comprises at least one of a beginning of the acquisition sub-interval, an end of the acquisition sub-interval, a duration of the acquisition sub-interval, or combinations thereof.

5. The method of claim 1, wherein the common preamble comprises a signature common to each of the plurality of network operating entities.

6. The method of claim 1, further comprising:
identifying multiple sub-intervals of the frame, each of the multiple sub-intervals designated for prioritized use by one of the plurality of network operating entities.

7. The method of claim 6, wherein the multiple sub-intervals are non-overlapping.

8. The method of claim 6, wherein the multiple sub-intervals are disjoint.

9. The method of claim 6, wherein the identifying multiple sub-intervals is based at least in part on the common preamble, the one or more network operating entity-specific signals, or combinations thereof.

10. The method of claim 1, wherein nodes from the same network operating entity share the same network operating entity-specific signal.

11. An apparatus for wireless communication, comprising:
means for receiving, within a frame in a shared radio frequency spectrum band shared by a plurality of network operating entities, a common preamble for discovery of resources and priority timing synchronization of the plurality of network operating entities with the frame, the common preamble comprising timing information for an acquisition sub-interval of the frame;
means for receiving during the acquisition sub-interval of the frame and after receipt of the common preamble, one or more network operating entity-specific signals;
means for identifying, based on the one or more network operating entity-specific signals, neighboring wireless nodes;
means for identifying multiple sub-intervals of the frame, each of the multiple sub-intervals designated for opportunistic use by one of the plurality of network operating entities; and
means for receiving priority information associated with one or more network operating entities of the plurality of network operating entities, wherein the priority information indicates a priority level for each of the one or more network operating entities for using one or more of the multiple sub-intervals.

12. The apparatus of claim 11, further comprising:
means for receiving the common preamble from multiple wireless nodes, wherein each of the multiple wireless nodes operates according to at least one of the plurality of network operating entities.

13. The apparatus of claim 11, wherein the common preamble comprises synchronization information for the acquisition sub-interval of the frame.

14. An apparatus for wireless communication, in a system comprising:
a processor;
memory in electronic communication with the processor; and
instructions stored in the memory and operable, when executed by the processor, to cause the apparatus to:
receive, within a frame in a shared radio frequency spectrum band shared by a plurality of network operating entities, a common preamble for discovery of resources and priority timing synchronization of the plurality of network operating entities with the frame, the common preamble comprising timing information for an acquisition sub-interval of the frame;
receive, during the acquisition sub-interval of the frame and after receipt of the common preamble, one or more network operating entity-specific signals;
identify, based on the one or more network operating entity-specific signals, neighboring wireless nodes;
identify multiple sub-intervals of the frame, each of the multiple sub-intervals designated for opportunistic use by one of the plurality of network operating entities; and
receive priority information associated with one or more network operating entities of the plurality of network operating entities, wherein the priority information indicates a priority level for each of the one or more network operating entities for using one or more of the multiple sub-intervals.

15. The apparatus of claim 14, wherein the instructions are further executable by the processor to:
receive the common preamble from multiple wireless nodes, wherein each of the multiple wireless nodes operates according to at least one of the plurality of network operating entities.

16. The apparatus of claim 14, wherein the common preamble comprises synchronization information for the acquisition sub-interval of the frame.

17. The apparatus of claim 16, wherein the synchronization information for the acquisition sub-interval of the frame comprises at least one of a beginning of the acquisition sub-interval, an end of the acquisition sub-interval, a duration of the acquisition sub-interval, or combinations thereof.

18. The apparatus of claim 14, wherein the common preamble comprises a signature common to each of the plurality of network operating entities.

19. The apparatus of claim 14, wherein the instructions are further executable by the processor to:

identify multiple sub-intervals of the frame, each of the multiple sub-intervals designated for prioritized use by one of the plurality of network operating entities.

20. The apparatus of claim 19, wherein the multiple sub-intervals are non-overlapping.

21. The apparatus of claim 19, wherein the multiple sub-intervals are disjoint.

22. The apparatus of claim 19, wherein the multiple sub-intervals are identified based at least in part on the common preamble, the one or more network operating entity-specific signals, or combinations thereof.

23. The apparatus of claim 14, wherein nodes from the same network operating entity share the same network operating entity-specific signal.

24. An article of manufacture comprising a non-transitory computer readable medium for wireless communication having stored therein instructions executable by a processor to:
receive, within a frame in a shared radio frequency spectrum band shared by a plurality of network operating entities, a common preamble for discovery of resources and priority timing synchronization of the plurality of network operating entities with the frame, the common preamble comprising timing information for an acquisition sub-interval of the frame;
receive, during the acquisition sub-interval of the frame and after receipt of the common preamble, one or more network operating entity-specific signals;
identify, based on the one or more network operating entity-specific signals, neighboring wireless nodes;
identify multiple sub-intervals of the frame, each of the multiple sub-intervals designated for opportunistic use by one of the plurality of network operating entities; and
receive priority information associated with one or more network operating entities of the plurality of network operating entities, wherein the priority information indicates a priority level for each of the one or more network operating entities for using one or more of the multiple sub-intervals.

25. The article of manufacture of claim 24, wherein the instructions are further executable by the processor to:
receive the common preamble from multiple wireless nodes, wherein each of the multiple wireless nodes operates according to at least one of the plurality of network operating entities.

26. The article of manufacture of claim 24, wherein the common preamble comprises synchronization information for the acquisition sub-interval of the frame.

27. The article of manufacture of claim 26, wherein the synchronization information for the acquisition sub-interval of the frame comprises at least one of a beginning of the acquisition sub-interval, an end of the acquisition sub-interval, a duration of the acquisition sub-interval, or combinations thereof.

28. The article of manufacture of claim 24, wherein the common preamble comprises a signature common to each of the plurality of network operating entities.

29. The article of manufacture of claim 24, wherein the instructions are further executable by the processor to:
identify multiple sub-intervals of the frame, each of the multiple sub-intervals designated for prioritized use by one of the plurality of network operating entities.

30. The article of manufacture of claim 29, wherein the multiple sub-intervals are non-overlapping.

31. The article of manufacture of claim 29, wherein the multiple sub-intervals are disjoint.

32. The article of manufacture of claim 29, wherein the multiple sub-intervals are identified based at least in part on the common preamble, the one or more network operating entity-specific signals, or combinations thereof.

33. The article of manufacture of claim 24, wherein nodes from the same network operating entity share the same network operating entity-specific signal.

* * * * *